(12) United States Patent
Fresia et al.

(10) Patent No.: US 10,581,502 B2
(45) Date of Patent: Mar. 3, 2020

(54) FIRST RADIO NODE AND METHODS THEREIN FOR ADJUSTING A SET OF BEAMS FOR COMMUNICATION IN A WIRELESS COMMUNICATIONS NETWORK

(71) Applicant: Telefonaktiebolaget LM Ericsson (publ), Stockholm (SE)

(72) Inventors: Maria Fresia, Stockholm (SE); Johan Ottersten, Stockholm (SE); Hugo Tullberg, Nyköping (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 384 days.

(21) Appl. No.: 15/552,089

(22) PCT Filed: Jun. 29, 2017

(86) PCT No.: PCT/SE2017/050722
§ 371 (c)(1),
(2) Date: Aug. 18, 2017

(87) PCT Pub. No.: WO2019/004885
PCT Pub. Date: Jan. 3, 2019

(65) Prior Publication Data
US 2019/0386726 A1    Dec. 19, 2019

(51) Int. Cl.
*H04B 7/06*     (2006.01)
*H04B 7/0408*   (2017.01)
(Continued)

(52) U.S. Cl.
CPC ......... *H04B 7/0617* (2013.01); *H04B 7/0408* (2013.01); *H04B 7/0695* (2013.01); *H04W 72/085* (2013.01); *H04B 7/0413* (2013.01)

(58) Field of Classification Search
CPC .. H04B 7/0617; H04B 7/0695; H04B 7/0408; H04B 7/0413; H04W 72/085
See application file for complete search history.

(56) References Cited

U.S. PATENT DOCUMENTS

| | | | |
|---|---|---|---|
| 8,666,309 B2* | 3/2014 | Hottinen | H04B 7/022 370/315 |
| 2006/0094373 A1 | 5/2006 | Hottinen | |

(Continued)

FOREIGN PATENT DOCUMENTS

| | | |
|---|---|---|
| EP | 2819768 A1 | 12/2014 |
| WO | 2017082810 A1 | 5/2017 |

(Continued)

OTHER PUBLICATIONS

International Search Report and Written Opinion dated Apr. 27, 2018 for International Application No. PCT/SE2017/050722 filed on Jun. 29, 2017, consisting of 14-pages.

(Continued)

*Primary Examiner* — Afshawn M Towfighi
(74) *Attorney, Agent, or Firm* — Christopher & Weisberg, P.A.

(57) ABSTRACT

A method performed by a first radio node for adjusting a set of beams for communication with a second radio node. The first radio node obtains an indication of a first set of beams based on a beam prediction model. The first radio node sends a training symbol on each beam in the first set of beams. The first radio node receives from the second radio node, feedback relating to the sent training symbols. A second beam is identified based on the feedback and is used for transmission. The received feedback and the second beam are used to adapt the beam prediction model. Further, the first radio node decides whether to adjust the number of beams in the first set of beams based on a relationship between the first and second beam. The adjusted first set of beams is to be used for sending training symbols before an upcoming communication.

19 Claims, 10 Drawing Sheets

(51) Int. Cl.
*H04W 72/08* (2009.01)
*H04B 7/0413* (2017.01)

(56) References Cited

U.S. PATENT DOCUMENTS

2011/0110453 A1* 5/2011 Prasad ................. H04B 7/0695
   375/285
2017/0078004 A1* 3/2017 Capar ................... H04W 16/28

FOREIGN PATENT DOCUMENTS

WO   2017105299 A1   6/2017
WO   2018034713 A1   2/2018

OTHER PUBLICATIONS

Jiho Song et al., Title: "Codebook Design for Hybrid Beamforming in Millimeter Wave Systems", IEEE ICC 2015 SAC—Millimeter-wave Communications, pp. 1298-1303, 2015.
Huiyu Ye et al., Title: "Adaptive Codebook Precoder Employing Kalman Filter for Time-Varying MIMO Channels", 2015 IEEE 26th International Symposium on Personal, Indoor and Mobile Radio Communications—(PIMRC): Fundamentals and PHY, pp. 34-38, 2015.
Song Noh et al., Title: "Multi-Resolution Codebook and Adaptive Beamforming Sequence Design for Millimeter Wave Beam Alignment", IEEE Transactions on Wireless Communications, pp. 1-14, 2016.

* cited by examiner

FIRST RADIO NODE AND METHODS THEREIN FOR ADJUSTING A SET OF BEAMS FOR COMMUNICATION IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2017/050722, filed Jun. 29, 2017 entitled "A FIRST RADIO NODE AND METHODS THEREIN FOR ADJUSTING A SET OF BEAMS FOR COMMUNICATION IN A WIRELESS COMMUNICATIONS NETWORK," the entirety of which is incorporated herein by reference.

TECHNICAL FIELD

Embodiments herein relate to a first radio node and methods therein. In particular, they relate to adjusting a set of beams for communication in a wireless communications network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

To meet traffic demands in future wireless communication systems, new frequency bands are considered, for example in the range of 30-100 GHz. These bands offer wide spectrum for high data rate communications, however, the coverage range is limited because of the system and channel characteristics at such high frequencies. The use of MIMO beamforming technologies may allow overcoming the range limitations. With appropriate transmit and receive strategies, the antenna gain offered by the arrays may substantially improve the range coverage. An example strategy is when the beamforming is applied at the transmitter side to focus the transmitted power in a certain direction thereby increasing the gain and thus improving the quality of the communication between the transmitter and receiver. In Noh, Song, Michael D. Zoltowski, and David J. Love. "*Multi-resolution codebook and adaptive beamforming sequence design for millimeter wave beam alignment.*" (2015), beamforming using fixed codebooks or predefined beams is investigated to choose the best beam pair between the transmitter and receiver to achieve the best performance. With the available directional beams, the best transmitter and receiver pair of beams is given by the beam pair that is more aligned, which is referred to as beam alignment. (See references Noh, Song, Michael D. Zoltowski, and David J. Love. "*Multi-resolution codebook and adaptive beamforming sequence design for millimeter wave beam alignment.*" (2015), and J. Song, J. Choi, and D. J. Love, "*Codebook design for hybrid beamforming in millimeter wave systems,*" in Proc. IEEE Int. Conf. on Commun., London, UK, June 2015). Beam alignment may be used to avoid estimating the channel directly when very large numbers of transmitter and receiver antenna elements are considered. Such a direct estimation of the channel is costly since the number of channel parameters may be large. However, beam alignment methods often involve an exhaustive search over all possible pairs of beams to find the best beams for transmission based on some measure, e.g., signal-to-noise ratio (SNR). Such an exhaustive search may be also costly to perform before an upcoming communication especially with large number of antennas at the transmitter and receiver. In Noh, Song, Michael D. Zoltowski, and David J. Love. "*Multi-resolution codebook and adaptive beamforming sequence design for millimeter wave beam alignment.*" (2015), and J. Song, J. Choi, and D. J. Love, "*Codebook design for hybrid beamforming in millimeter wave systems,*" in Proc. IEEE Int. Conf. on Commun., London, UK June 2015, finding faster ways to perform this alignment has been investigated by exploiting system and channel characteristics to derive complex searching algorithms and to better focus the direction of the beams to achieve better performance. However, a problem with such approaches is the lack of beam search flexibility that is limited by rules defined by the codebook, and further, there may be a need for full channel knowledge which is costly.

SUMMARY

It is an object of embodiments herein to improve the performance of beam alignment in a wireless communications network.

According to a first aspect of embodiments herein, the object is achieved by a method performed by a first radio node for adjusting a set of beams for communication with a second radio node. The first radio node and the second radio node operate in a wireless communications network. The first radio node obtains an indication of a first set of beams based on a beam prediction model, which first set of beams comprises a first beam and a number of first neighbouring beams to the first beam. The first radio node then sends a training symbol on each respective beam in the first set of beams. After sending the training symbols, the first radio node receives from the second radio node, feedback relating to one or more of the sent training symbols on each respective beam in the first set of beams. From the first set of beams, a second beam is identified based on the received feedback and this second beam is used for transmission. The received feedback and the second beam is used to adapt the beam prediction model. Further, the first radio node decides whether to adjust the number of beams in the first set of beams based on a relationship between the first beam and the second beam. The adjusted first set of beams is to be used for sending training symbols before an upcoming communication between the first radio node and the second radio node.

According to a second aspect of embodiments herein, the object is achieved by a first radio node for adjusting a set of beams for communication with a second radio node. The first radio node and the second radio node are operable in a wireless communications network. The first radio node is configured to:
  obtain an indication of a first set of beams based on a beam prediction model, which first set of beams comprises a first beam and a number of first neighbouring beams to the first beam;
  send a training symbol on each respective beam in the first set of beams;
  receive from the second radio node, feedback relating to one or more of the sent training symbols on each respective beam in the first set of beams;
  identify a second beam based on the received feedback to be used for transmission;
  adapt the beam prediction model based on the received feedback and the second beam; and
  decide whether to adjust the number of beams in the first set of beams based on a relationship between the first beam and the second beam, which adjusted first set of beams is to be used for sending training symbols before an upcoming communication between the first radio node and the second radio node.

Since the first radio node adjusts a set of beams for communication before an upcoming communication with a second radio node in a wireless communications network, the need to do an exhaustive sweeping across all the available beams before an upcoming communication is reduced without affecting the quality of the communication between the two radio nodes. This is since the number of beams to be swept is adjusted depending on the quality of the output of the beam prediction model as compared to the measured beam quality, that is the relationship between the first beam and the second beam. This results in a faster and less complex beam alignment between the first radio node and the second radio node in the wireless communications network.

A further advantage of embodiments herein is that the beam prediction model is continuously adapted depending on the received feedback from the second radio node. This improves the output of the beam prediction model in predicting the first beam which is comprised in the first set of beams.

BRIEF DESCRIPTION OF THE DRAWINGS

Examples of embodiments herein are described in more details with reference to attached drawings in which.

DETAILED DESCRIPTION

Figure 1:
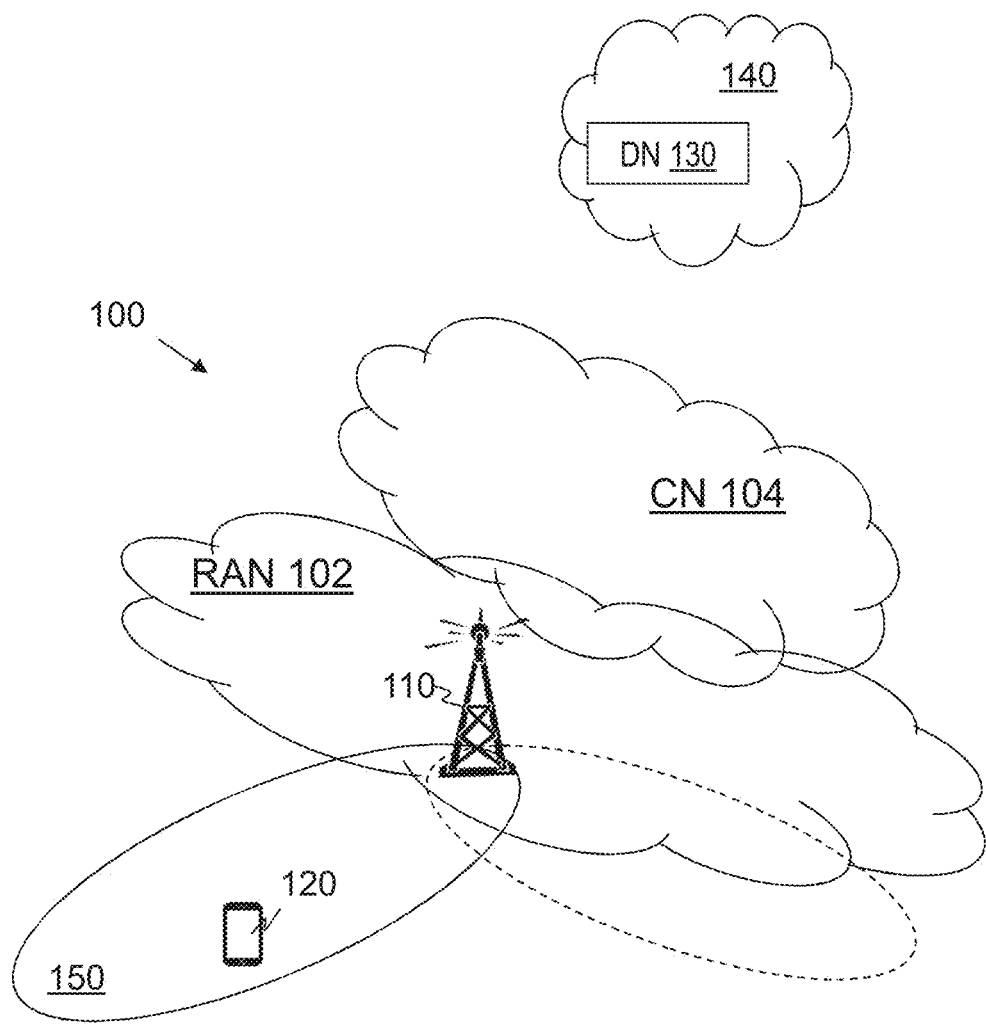
FIG. 1 is a schematic block diagram illustrating embodiments of a wireless communications network.

A wireless communications network 100, in which embodiments herein may be implemented, is schematically illustrated in FIG. 1.

The wireless communication network 100 comprises one or more RANs, e.g. a RAN 102, and one or more CNs, e.g. a CN 104. The wireless communications network 100 may be a cellular communications network, and may use a number of different technologies, such as Wi-Fi, LTE, LTE-Advanced, 5G, WCDMA, Global System for Mobile communications/enhanced Data rate for GSM Evolution (GSM/EDGE), NB-IoT, just to mention a few possible implementations. Embodiments herein relate to recent technology trends that are of particular interest in a 5G context, however, embodiments are also applicable in further development of the existing wireless communication systems such as e.g. WCDMA and LTE.

Radio nodes such as a first radio node 110 and a second radio node 120, operate in the wireless communications network 100 such as e.g. in the RAN 102. The first radio node 110 may be a network node as exemplified below or a wireless device such as a UE as exemplified below and the second radio node 120 may be a network node as exemplified below or a wireless device such as a UE as exemplified below. In the following examples herein, the first radio node 110 is a network node and the second radio node 120 is a UE. However, it may as well be the other way around, wherein the first radio node 110 is a UE and the second radio node 120 is a network node. Further, it may as well be that the first radio node 110 and second radio node 120 are both UEs or both network nodes. The first radio node 110, in this example being a network node, provides radio coverage over a geographical area, which may also be referred to as a cell, a cluster, a beam or a beam group 150, of a first Radio Access Technology (RAT), such as 5G, LTE, Wi-Fi or similar. The first radio node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a second radio node 120, which may be a UE, within the service area served by the first radio node 110 depending e.g. on the first radio access technology and terminology used. The first radio node 110 may be referred to as a serving radio network nodes and communicate with a second radio node 120, such as a UE, with Downlink (DL) transmissions to the second radio node 120 and Uplink (UL) transmissions from the second radio node 120. Other examples of the first radio node 110 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

The second radio node 120 is in this example a wireless device such as a UE which may be any of a mobile station, a non-Access Point (non-AP) STA, a STA, a user equipment and/or a wireless terminal, communicate via one or more RANs such as the RAN 102, to one or more CNs such as the CN 104. Thus, the second radio node 120 is operating in the wireless communications network 100.

It should be understood by the skilled in the art that "UE" is a non-limiting term which means any wireless device, terminal, communications device, wireless communication terminal, user equipment, Machine-Type Communication (MTC) device, Device-to-Device (D2D) terminal, or node e.g. smart phone, laptop, mobile phone, sensor, relay, mobile tablets, an Internet-of-Things (IoT) device, e.g. a Cellular IoT (CIoT) device or even a small base station communicating within a service area.

Please note that the term user equipment used in this document also covers other wireless devices such as Machine-to-Machine (M2M) devices, and IoT devices even though they do not have any user.

Some actions in methods herein are performed by the first radio node 110 and second radio node 120. As an alternative, any Distributed network Node (DN) 130 and functionality, e.g. comprised in a cloud 140 may be used for performing these actions.

According to some embodiments herein, refined learning by forming a beam prediction model in a learning phase and updating the beam prediction model in the learning or data transmission phase is used to mitigate the need to perform an exhaustive search over all beams in a set of available beams of the first radio node 110 before data transmission. The wording "set of available beams" when used herein means all the beams that the first radio node 110 has access to. The set of available beams may be known beforehand depending on the first radio node 110 capabilities. The beam prediction model enables the prediction of a first beam from the set of available beams at the next time instant. The first beam when predicted by the beam prediction model according to embodiments herein, is preferably the beam with the best predicted channel conditions between the first radio node 110 and the second radio node 120.

The beam prediction model is created and updated in a learning phase and is preferably used to find the beam with the best quality, the first beam, out of the available beams in the learning and data transmission phases. The learning phase comprises sending a training symbol on each of a set of available beams at the first radio node 110. Based on the received feedback from the second radio node 120 relating to one or more of the sent training symbols on each of the set of available beams, the first radio node 110 identifies a subset of beams of the set of available beams. In one example, the feedback is in the form of response signals comprising information on the SNR, or any other measure related to the available channel information. The identified subset of beams is used as input to the beam prediction model. The beam prediction model is created or updated based on this input. Such beam prediction model uses machine learning techniques, such as, decision trees, random forests, neural networks, recurrent neural networks. The choice of which machine learning technique that is used may affect the quality of the prediction and the involved complexity. Such a learning phase may be run several times to refine its output which provides the first beam, which first beam is comprised in the first set of beams.

The learning phase is followed by a data transmission phase. The first radio node 110 obtains an indication of the first set of beams based on the beam prediction model. This first set of beams comprises the first beam and a number of first neighbouring beams to the first beam. In one embodiment, the neighbouring beams are, e.g., centered around the predicted first beam. However, it may as well be that the neighbouring beams are chosen sparsely making them scattered uniformly or non-uniformly around the predicted first beam. The first set of beams may be smaller than the set of all available beams. Training symbols are sent on each respective beam in the first set of beams. Based on the received feedback from the second radio node 120 relating to one or more of the sent training symbols on each respective beam in the first set of beams, the first radio node 110 identifies a second beam preferably being the beam with the best quality out of the first set of beams, which will be used for transmission. The beam prediction model is adapted based on the received feedback and the second beam.

Further, the first radio node 110 decides whether to adjust the number of beams in the first set of beams based on a relationship between the first beam and the second beam, which is preferably the best measured beam. The predicted best beam, such as the first beam, in comparison with the second beam is used as a discriminator to understand whether there is high uncertainty in the prediction. Such uncertainty is captured in a reward function policy to increase, decrease, or keep unchanged the number of beams in the first set of beams.

In a case where the first beam and second beam differ a lot from each other, there is a high uncertainty in the prediction and more beams must be swept to select the best beam for an upcoming transmission. This is an example where the first radio node 110 and the second radio node 120 have a rapidly varying channel conditions between them perhaps due to obstacles causing reflections which makes it difficult to predict the first set of beams to be searched with low uncertainty.

In a case where the first beam and second beam coincide to a large degree with each other, there is a low uncertainty in the prediction and it is enough for the first radio node 110 to sweep only a set of beams comprising a smaller number of beams. This may be an example where the first radio node 110 and the second radio node 120 have slowly varying channel conditions between them perhaps due to limited reflections from the surrounding objects. Therefore, the search for the best beam for transmission is fast since the best beam may quickly be identified.

The term sweep when used herein means to send training symbols on each beam in a set of beams. Therefore, such adjustment in the number of beams in the first set of beams affects the number of training symbols that are sent before any upcoming communication between the first radio node 110 and the second radio node 120.

In another embodiment, the communication between the first radio node 110 and the second radio node 120 comprises the data transmission phase without performing a learning phase. The data transmission phase further comprises creating and adaption the beam prediction model. Such creation and adaption during the data transmission phase is referred to as reinforcement learning.

Figure 2A:
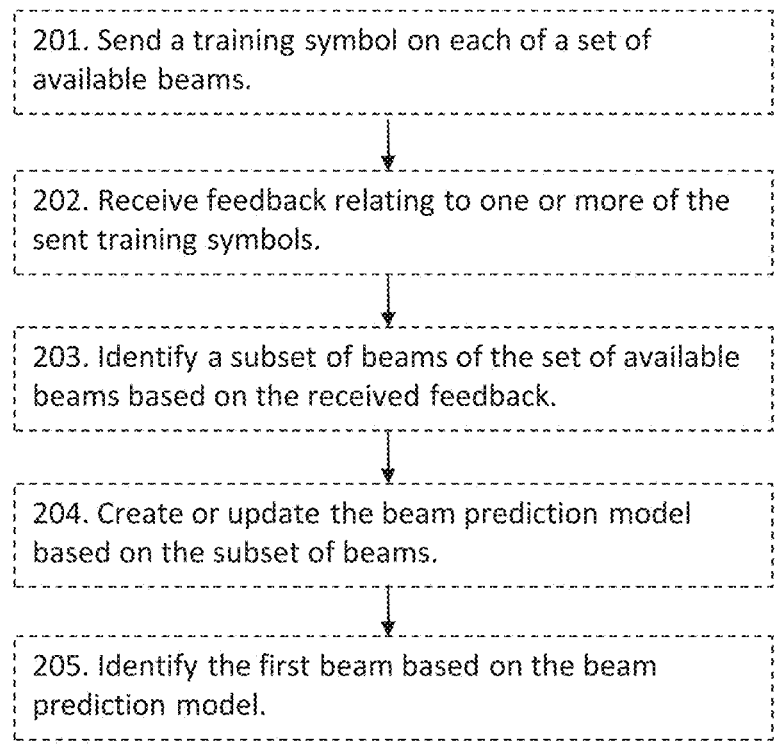
FIG. 2a is a flowchart illustrating embodiments of a method in the first radio node.
Figure 2B:
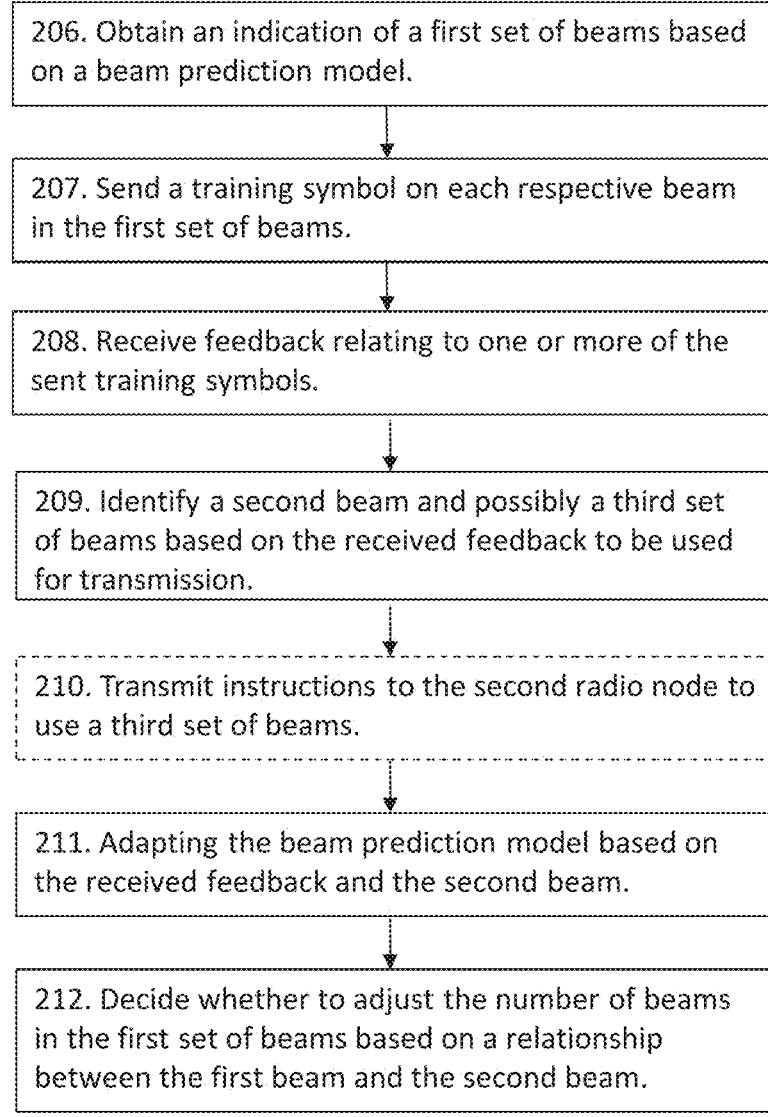
FIG. 2b is a flowchart illustrating embodiments of a method in the first radio node.

Example embodiments of a method performed by the first radio node 110 for adjusting a set of beams for communication with the second radio node 120, will now be described with reference to a flowchart depicted in FIG. 2 which comprises FIG. 2a and FIG. 2b. The method will first be described in a view seen from the first radio node 110 together with FIG. 2, followed more detailed explanations and examples. As mentioned above, the first radio node 110 and second radio node 120 operate in a wireless communications network 100.

The method comprises the following actions, which actions may be taken in any suitable order. Actions that are optional are presented in dashed boxes in FIG. 2.

The first radio node 110 will in Action 206 obtain an indication of a first set of beams. In some embodiments, this is done by performing optional Actions 201-205 one or more times, which comprises a learning phase. This learning phase is used to train a beam prediction model based on the channel conditions between the first radio node 110 and the second radio node 120.

Action 201

In order for the first radio node 110 to measure the channel conditions with the second radio node 120, the first radio node 110 needs feedback from the second radio node 120 on each of a set of available beams.

The first radio node 110 sends a training symbol on each of a set of available beams.

The first radio node 110 may sweep through all the beams in the set of available beams and send a training symbol on each beam at a time. Such training symbols may be in the form of specific sequences where the second radio node 120 may measure on.

Action 202

To assess the quality of the set of available beams, the first radio node 110 waits for feedback from the second radio node 120 on the sent training symbols.

The first radio node 110 receives from the second radio node 120, feedback relating to one or more of the sent training symbols on each of the set of available beams.

In some embodiments, the received feedback from the second radio node 120 corresponding to the sent training symbols is in the form of Signal-to-Noise Ratio (SNR) or another measure related to the available channel information.

The received feedback may be in the form of a report comprising information on the SNR, or any other measure related to the available channel information, on each of the training symbols, and their corresponding beams that are received by the second radio node 120. The information to be reported to the first radio node 110 may be sent at once or on several instances, for example periodically.

Action 203

In order for the first radio node 110 to create or update the beam prediction model, the first radio node 110 needs to select a subset of beams meeting certain criteria, such that the output of the beam prediction model is refined. Further, the selected subset of beams may be used for further communication with the second radio node 120.

The first radio node 110 thus identifies a subset of beams of the set of available beams based on the received feedback.

The first radio node 110 may select the subset of beams which satisfy certain criteria, for example, above a certain SNR or certain channel quality indicators (CQI) as those used in LTE. The selection affects the quality of communication between the first radio node 110 and the second radio node 120 and further affects the outcome of the beam prediction model.

Action 204

The information on the selected subset of beams may be used by the first radio node 110 to e.g. create or update the beam prediction model. Such action is needed in order to refine the output of the beam prediction model for upcoming communication between the first radio node 110 and the second radio node 120.

The first radio node 110 creates or updates the beam prediction model based on the subset of beams of the set of available beams.

The beam prediction model uses machine learning techniques, such as, decision trees, random forests, neural networks, recurrent neural networks. The choice of which machine learning technique affects the quality of the prediction and the involved complexity.

Action 205

Once the prediction model is created or updated, the first radio node needs to identify the first set of beams, comprising preferably the beam with the best predicted channel conditions between the first radio node 110 and the second radio node 120, to be used for sending training symbols before an upcoming communication between the first radio node 110 and the second radio node 120.

The first radio node 110 identifies the first beam based on the beam prediction model, which first beam is comprised in the first set of beams.

The beam prediction model outputs a first beam and a number of first neighbouring beams to the first beams. The choice and quality of the predicted first beam and the number of first neighbouring beams to the first beams depend on the choice of the machine learning technique used.

The first radio node 110 will perform a data transmission phase by performing Actions 206-212. In addition to data transmission, the first radio node 110 adapts the beam prediction model, and adjusts the number of beams in the first set of beams. Adapting the beam prediction model allows for a refined output from the beam prediction model for upcoming communication between the first radio node 110 and the second radio node 120. In addition, by adjusting the size of the first set of beams, the complexity and exchanged training information is adjusted without affecting the quality of the communication between the first radio node 110 and the second radio node 120. Further, the first radio node may transmit instructions to the second radio node 120 to use a third set of beams for transmission.

Action 206

In order for the first radio node 110 to start the data transmission phase, a first set of beams should be obtained.

The first radio node 110 obtains an indication of a first set of beams based on a beam prediction model. The first set of beams comprises a first beam and a number of first neighbouring beams to the first beam.

This may be done by having performed Actions 201-205 one or more times. The beam prediction model outputs a first beam, which preferably is the beam with the best predicted channel conditions between the first radio node 110 and the second radio node 120, and a number of first neighbouring beams to the first beam. The choice and quality of the predicted first beam and the number of first neighbouring beams to the first beams depend on the choice of the machine learning technique used. Examples of machine learning techniques are decision trees, random forests, neural networks, recurrent neural networks.

Action 207

In order for the first radio node 110 to measure the channel conditions with the second radio node 120 on the first set of beams, the first radio node 110 needs feedback from the second radio node 120 on the first set of beams.

The first radio node 110 sends a training symbol on each respective beam in the first set of beams.

The first radio node 110 may sweep through all the beams in the first set of beams and send a training symbol on each beam at a time. Such training symbols may be in the form of specific sequences where the second radio node 120 may measure on.

Action 208

In order for the first radio node 110 to assess the quality of the first set of beams, the first radio node 110 waits for feedback from the second radio node 120 on each of the sent training symbols, which will be used for the quality assessment.

The first radio node 110 receives from the second radio node 120, feedback relating to one or more of the sent training symbols on each respective beam in the first set of beams.

In some embodiments, the received feedback from the second radio node 120 corresponding to the sent training symbols is in the form of SNR, or another measure related to the available channel information.

The received feedback may be in the form of a report comprising information on quality such as the SNR, or any other measure related to the available channel information, on each of the training symbols, and their corresponding beams that are received by the second radio node 120.

Action 209

In order to carry out data transmission, the first radio node 110 needs to select a suitable second beam for the data transmission based on a certain criterion and the received feedback e.g. relating to the beam quality.

The first radio node 110 identifies a second beam based on the received feedback to be used for transmission.

In some embodiments, the first radio node 110 identifies the second beam, which preferably is the best measured beam, and a further third set of beams comprising a third beam and a number of neighbouring beams based on the received feedback on each respective beam in the first set of beams.

The choice of the second beam affects the quality of communication between the first radio node 110 and the second radio node 120. Further, the first radio node 110 may further select a third set of beams to be used by the second radio node 120 for transmitting and receiving data. Information about the selected third set of beams may be transmitted to the second radio node 120. The third set of beams may be chosen based on the radio conditions at the second radio node 120.

Action 210

In some embodiments, the first radio node 110 may instruct the second radio node 120 to use the third set of beams.

The first radio node 110 may then transmit instructions to the second radio node 120 to use the third set of beams for transmitting and receiving data.

The first radio node 110 may transmit the instructions to the second radio node 120 using a dedicated message. Such instructions may allow for a better quality of communication between the first radio node 110 and the second radio node 120.

Action 211

In order to keep the beam prediction model updated, the first radio node 110 uses the received feedback and the identified second beam for carrying out the adaptions.

The first radio node 110 adapts the beam prediction model based on the received feedback and the second beam. Such adaptation may be performed by a machine learning technique such as, decision trees, random forests, neural networks, recurrent neural networks.

The usage of the received feedback and the identified second beam for carrying out the adaptions depends on the machine learning technique used. Such adaptation may allow for a refined output from the beam prediction model for upcoming communication between the first radio node 110 and the second radio node 120.

Action 212

The size of the first set of beams affects the number of training symbols to be sent by the first radio node 110, the feedback received, and the complexity for carrying out the Actions above. Therefore, the number of beams in the first set of beams shall be reduced if possible.

The first radio node 110 decides whether to adjust the number of beams in the first set of beams based on a relationship between the first beam and the second beam. The adjusted first set of beams is to be used for sending training symbols before an upcoming communication between the first radio node 110 and the second radio node 120. The first beam is preferably the beam with the best predicted channel conditions between the first radio node 110 and the second radio node 120. Further, the second beam is preferably the best measured beam, for example, in terms of SNR or another measure related to the available channel information.

In some embodiments, the first radio node 110 decides whether to adjust the number of beams in the first set of beams by further taking into account any one or more of: radio channel properties between the first radio node 110 and the second radio node 120 and packet error rates of the data being sent between the first radio node 110 and the second radio node 120.

In some embodiments, the first radio node 110 decides whether to adjust the number of beams in the first set of beams, by deciding to decrease the number of beams based on any one or more of: the first and second beam overlap to a predefined level, the radio channel properties between the first radio node 110 and the second radio node 120 are above a first threshold, and the packet error rates of the data being sent between the first radio node 110 and the second radio node 120 are lower than a second threshold; otherwise the first radio node 110 decides to increase the number of beams in the first set of beams.

In some embodiments, the relationship between the first beam and the second beam is associated to the extent that both beams coincide.

By adjusting the size of the first set of beams, the complexity and exchanged training information is adjusted without affecting the quality of the communication between the first radio node 110 and the second radio node 120.

By performing the above method, the first radio node 110 adjusts a set of beams for communication with the second radio node 120 without having to do an exhaustive sweeping across all the available beams before an upcoming communication.

Embodiments herein will now be further described and exemplified. The text below is applicable to and may be combined with any suitable embodiment described above.

Figure 3A:
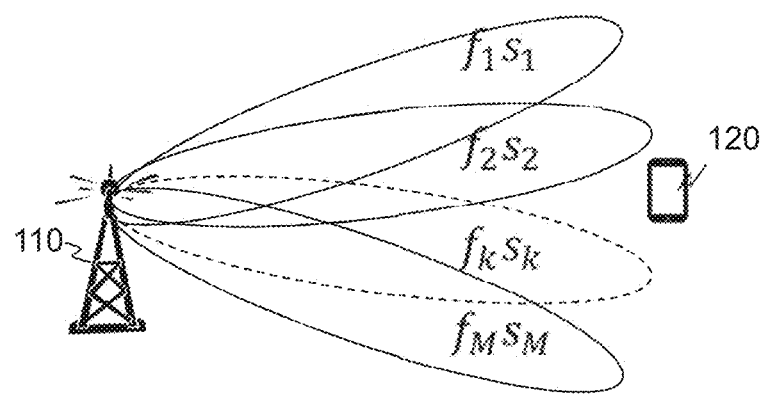
FIG. 3a is a schematic block diagram illustrating a set of available beams.
Figure 3B:
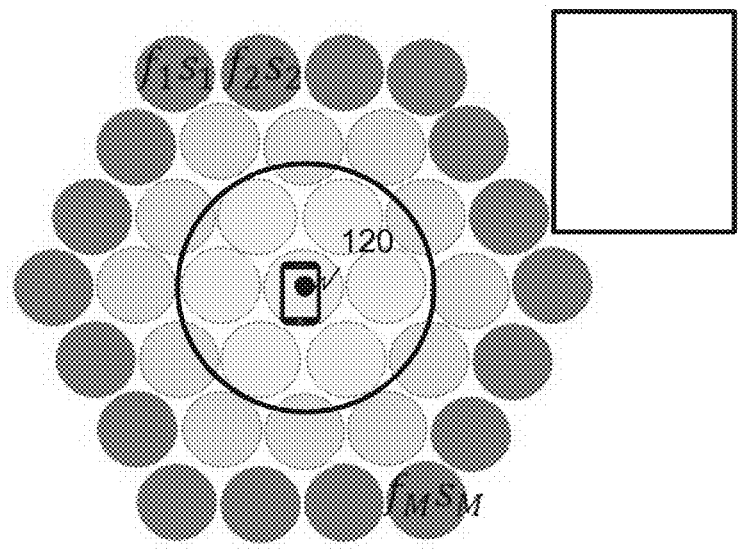
FIG. 3b is a schematic block diagram illustrating a set of available beams.

In an example embodiment, a fixed set of available beams is assumed at the first radio node 110 whereas the second radio node 120 is equipped with a single isotropic antenna for the sake of clarity, i.e., no beamforming at the second radio node 120. The fixed set of available beams at the first radio node 110 may be in the form of a codebook $F=\{f_1, f_2, \ldots, f_M\}$ which may be spatially distributed. FIG. 3a shows the set of M available beams at the first radio node 110, each depicted with its signature, and FIG. 3b shows an elevated view from above on how the available beams from the first radio node 110 look from the second radio node 120 perspective. The numbering of the beams is just an example, and for simplicity it is assumed that neighbouring beams have sequential numbering. The beams may have different azimuth and zenith, spanning a 3-Dimensional (3D) area. Each beam of the codebook may be identified with an index $m=1, \ldots, M$ and covers a sector of the cell area. Further, each beam is also associated to a training symbol such as e.g. a signature $s_m$, $m=1, \ldots, M$.

Figure 4:
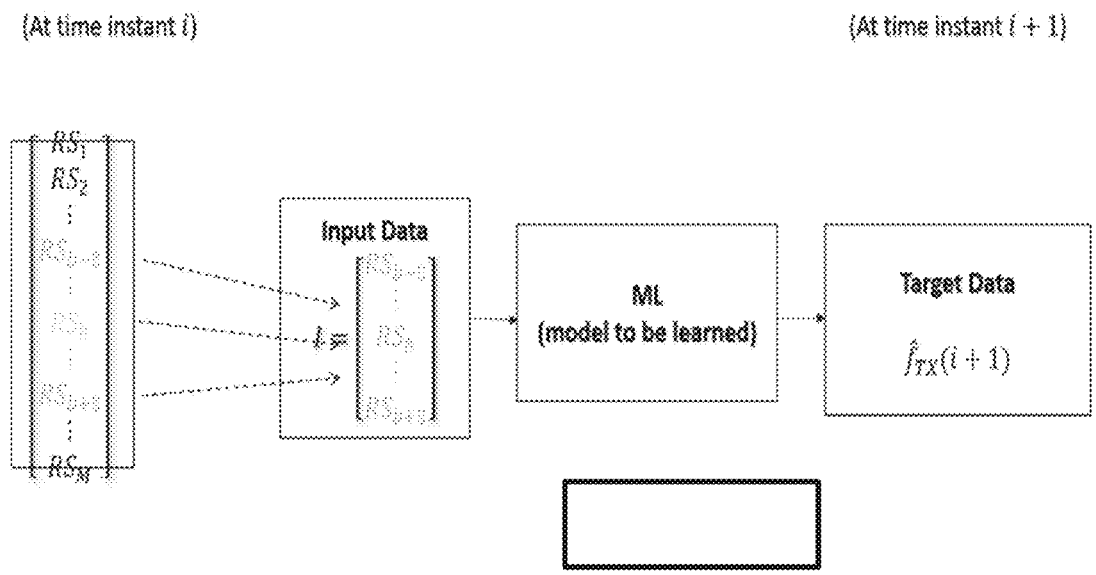
FIG. 4 is a schematic block diagram illustrating embodiments of a learning phase.

The learning phase in which the beam prediction model is created and updated is depicted in FIG. 4 and comprises performing one or more times the following actions:

The first radio node 110 sweeps each of a set of available beams from the codebook $F=\{f_1, f_2, \ldots, f_M\}$), by sending training symbols or signatures. This relates to action 201 described above.

The first radio node 110 receives feedback from the second radio node 120 relating to one or more of the sent training symbols on each of the set of available beams. The received feedback from the second radio node 120 corresponding to the sent training symbols is in the form of SNR or another measure related to the available channel information. In LTE, such received feedback is referred to as reference signals (RS). This feedback may be in the form of vector comprising $[RS_1, RS_2, \ldots RS_M]$. This relates to action 202 described above.

The first radio node 110 identifies a subset of beams of the set of available beams based on the received feedback at a time instant i. This subset comprises the best measured beam and a number of neighbouring beams. This subset of beams has a size $L+1 \le M$. The value L is the number of neighbouring beams and will be used later in the data transmission phase. In FIG. 4, L=7 as an example. This relates to action 203 described above.

The machine learning based beam prediction model is created or updated based on the identified subset of beams and the corresponding received feedback. The reference signal for the best measured beam is denoted as $RS_b$, and for the neighbouring beams $RS_{b-3} \ldots RS_{b+3}$, see FIG. 4. The identified subset of beams and the corresponding received responses $RS_b$, and $RS_{b-3} \ldots RS_{b+3}$ is the Input data to the machine learning based beam prediction modeled referred to as model to be learned. This relates to action 204 described above.

The beam prediction model outputs the first beam which first beam is comprised in the first set of beams. This relates to action 205 described above.

The learning phase may preferably be performed several times to refine the output of the machine learning based beam prediction model. The output of the beam prediction model is the first beam which is the best beam which may be referred to as Target Data $\hat{f}_{TX}(i+1)$ which is comprised in the first set of beams. $\hat{f}_{TX}(i+1)$ is the best predicted beam at the first radio node 110 at time instant i+1.

Figure 5:
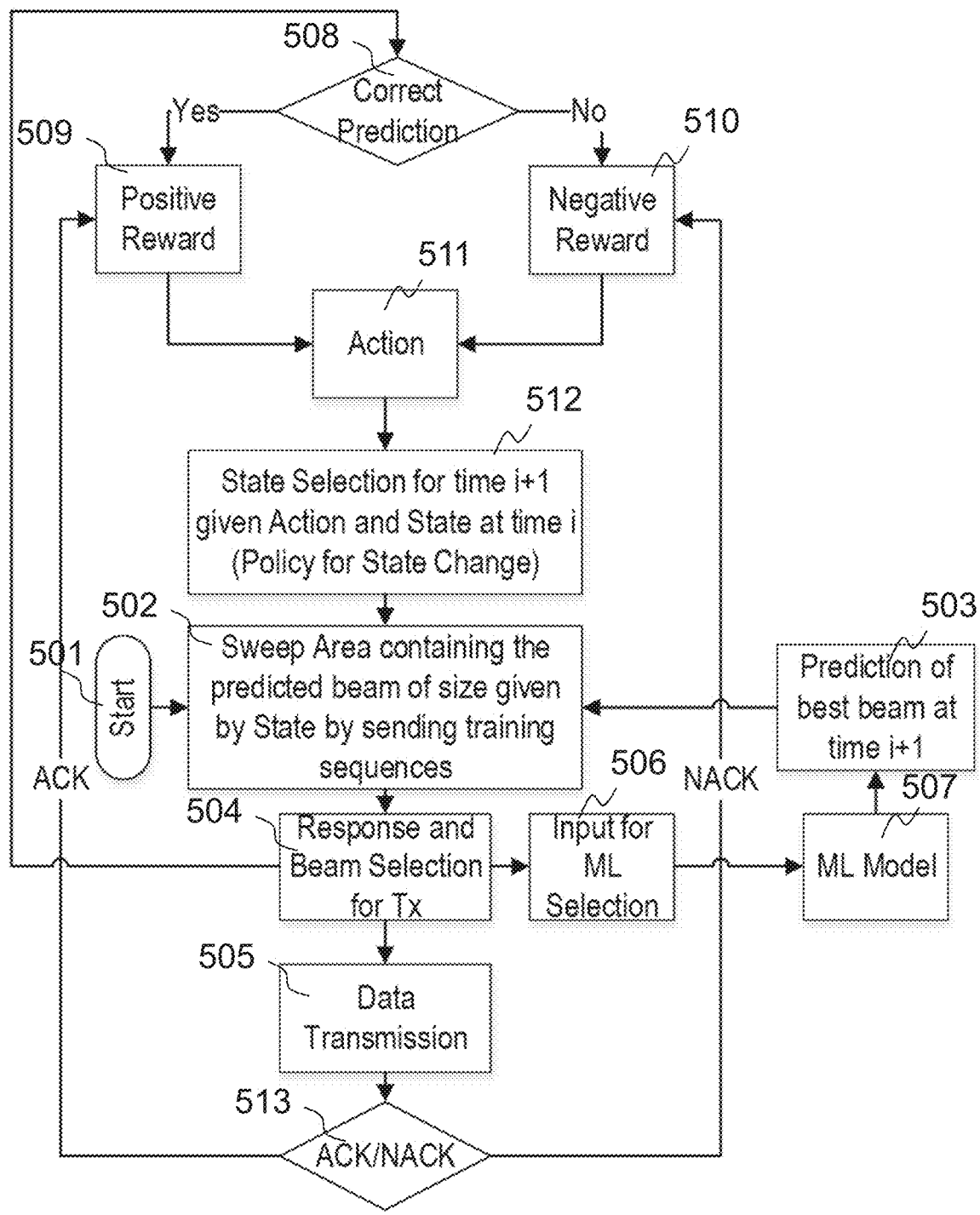
FIG. 5 is a flowchart depicting embodiments of a method in the first radio node.

For the data transmission phase depicted in FIG. 5, an exhaustive search in the entire codebook is therefore not required, but only in the identified first set of beams. It comprises the following steps starting at 501:

An obtained first set of beams is swept 502 by sending a training symbol on each respective beam in the first set of beams.

The indication of a first set of beams is obtained 503 based on the beam prediction model, which first set of beams comprises a first beam and a number of first neighbouring beams to the first beam. This relates to actions 206 and 207 described above.

Figure 6A:
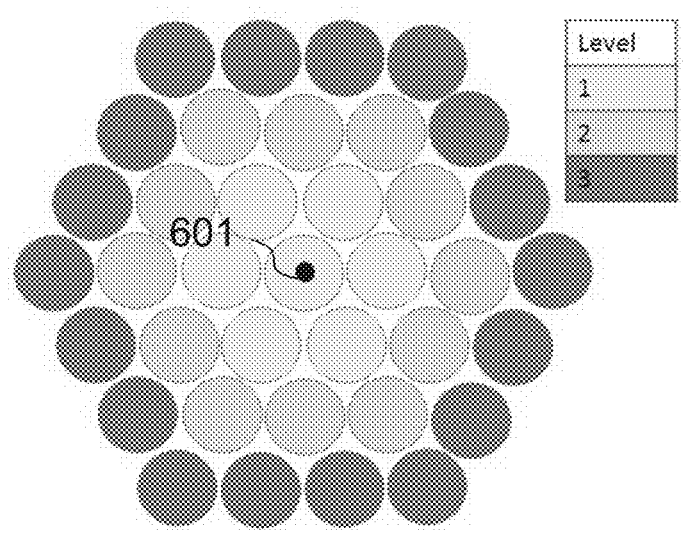
FIG. 6a is a schematic block diagram illustrating neighbouring beams.
Figure 6B:
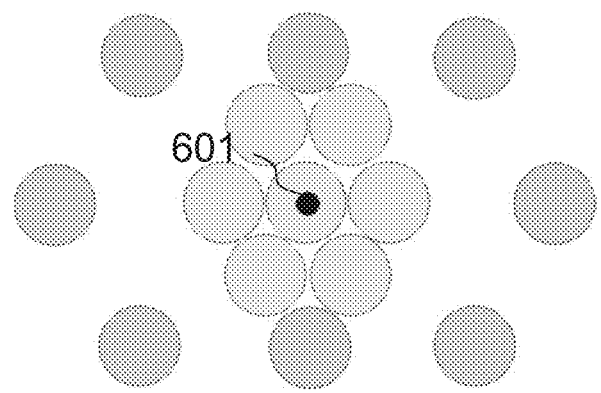
FIG. 6b is a schematic block diagram illustrating neighbouring beams.

The number of neighbouring beams and how they are selected may defined by a state function, where different states may mean different number of neighbouring beams and how neighbouring beams are selected. FIG. 6 illustrates a first beam along with its neighbours, where FIG. 6a illustrates three levels of neighbours corresponding to three different states. The black dot 601 indicates the first beam along with its level 1, level 2, and level 3 neighbours. FIG. 6b illustrates neighbours which are sparsely chosen. Sparsely chosen neighbours may allow for a small first set of beams even when the channel conditions are rapidly varying.

Referring again to FIG. 5, the first radio node 110 receives 504 from the second radio node 120, feedback relating to one or more of the sent training symbols on each respective beam in the first set of beams. The received feedback is, e.g., $[RS_1, RS_2, \ldots RS_L]$. This relates to action 208 described above.

Out of the first set of beams, a second best measured beam is identified based on the received feedback to be used 505 for data transmission. This relates to action 209 described above.

The received feedback and the second beam is used 506 as input to the machine learning beam prediction model 507. Such received feedback adapts the model so the output is refined for upcoming communication. This relates to action 211 described above.

Figure 7:
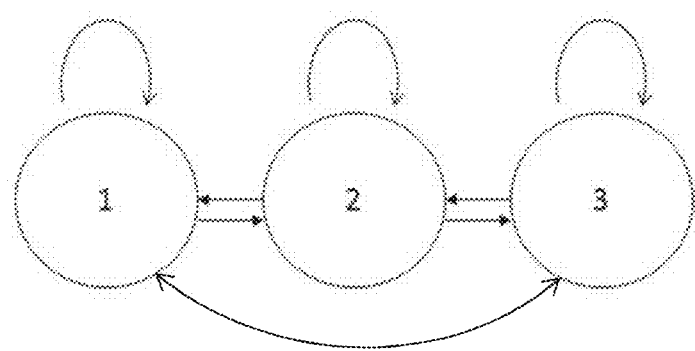
FIG. 7 is a schematic block diagram illustrating embodiments of different states.

The state of the system defining the number of neighbouring beams is adjusted based on a relationship between the first beam and the second beam. This relates to action 212 described above. If the predicted first beam and the second measured beam coincide 508 to a large degree with each other, there is a low uncertainty in the prediction and a positive reward 509 is given, otherwise a negative reward 510. Different reward functions may be used and in this example a reward function in terms of a positive and negative reward is described for simplicity. Such rewards are coupled with actions 511 where such actions involve switching 512 between the different states defining the number of neighbouring beams. FIG. 7 depicts an example of three states: state 1, state 2, and state 3, the system may transition to depending on the relationship between the first beam and the second beam. E.g. States 1, 2, 3 may refer to the neighbouring beams belonging to Levels 1, 2, and 3 in FIG. 6a, respectively. For example, if the reward is positive, the system may stay in the same state or transit to a new state where the number of beams is smaller. The actions that are taken may be defined by the policy used in the system. An example is a conservative policy where the number of neighbouring beams is reduced after multiple positive rewards, but increased for one negative reward. Also, the whole set of available beams may be swept after several negative rewards. Different policies may be chosen based on the environment the first and second radio node are operating in.

In another embodiment, the rewards may take into consideration information related to whether the messages transmitted by the first radio node 110 are received correctly by the second radio node 120. Therefore, by keeping track of the Acknowledgments and Negative Acknowledgements 513, the reward functions may be adjusted accordingly thus affecting the state of the system.

The adjusted first set of beams is to be used for sending training symbols before an upcoming communication between the first radio node (110) and the second radio node (120).

As mentioned above, the DN 130 and functionality, e.g. comprised in the cloud 140 as depicted in FIG. 1, may be used for performing one or more of the above actions. This allows adjusting a set of beams for communication between the first radio node 110 and the second radio node 120 while taking into consideration the presence of other communicating radio nodes in the vicinity.

In another embodiment relating to mobility, the first radio node 110 may receive input from the cloud 140 to handover the second radio node 120 to another radio node for achieving a better communication quality.

Figure 8A:
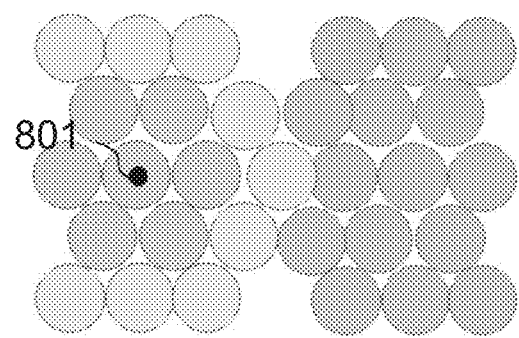
FIG. 8a is a schematic block diagram illustrating a set of beams according to some embodiments.
Figure 8B:
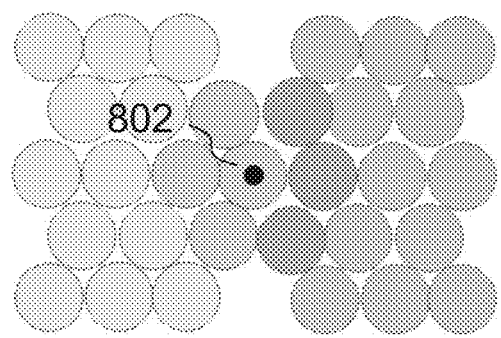
FIG. 8b is a schematic block diagram illustrating a set of beams according to some embodiments.

FIG. 8 shows an elevated view from above on how the first set of beams is given by the beam prediction model. In FIG. 8a, the first set of beams comprising the first beam indicated with a black dot 801 belong to the beams one radio node has access too, e.g., the first radio node 110. Whereas, in FIG. 8b, the first set of beams comprising the first beam indicated with a black dot 802 given by the beam prediction model comprises beams in which two radio nodes need to cooperate so that the predicted first set of beams is used for sweeping. An example is when a first radio node 110 and a third radio node (not shown in the figure) cooperate by sweeping the first set of beams for an upcoming communication with the second radio node 120. This is advantageous since such a cooperation may reduce the time required to perform a handover of the second radio node 120 from the first radio node 110 to the third radio node, or vice versa. Further, the communication quality may be maintained during a handover.

Figure 9:
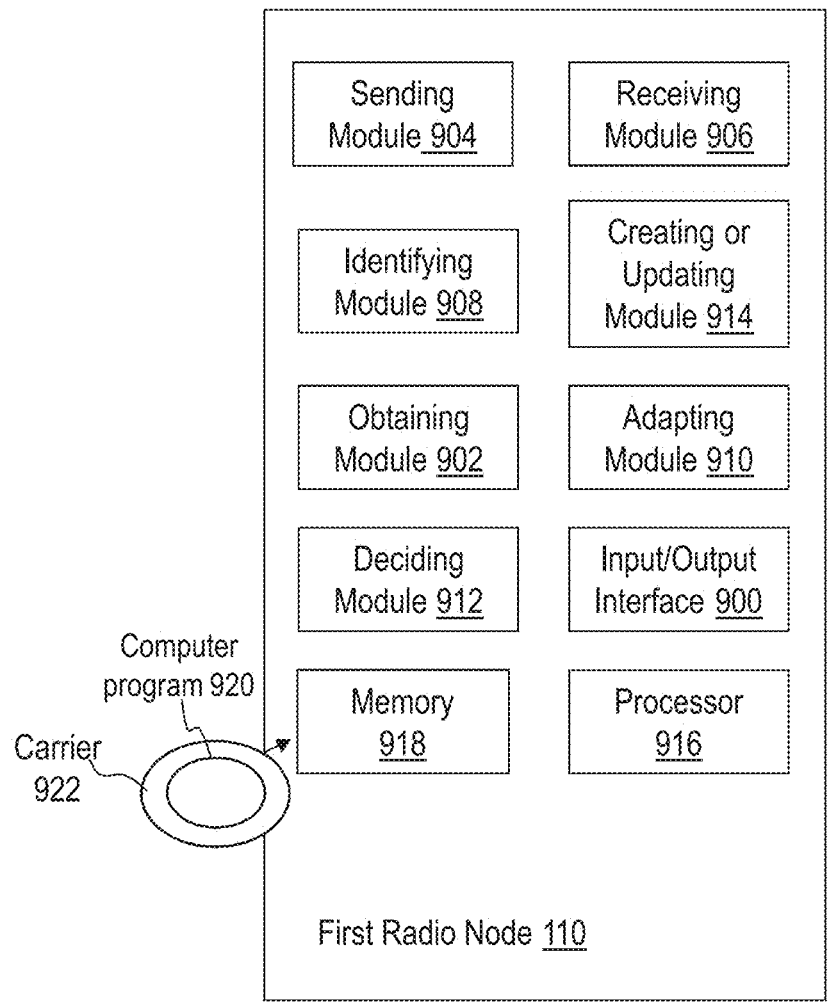
FIG. 9 is a schematic block diagram illustrating embodiments of the first radio node.

To perform the method actions for adjusting a set of beams for communication with a second radio node 120, the first radio node 110 may comprise the following arrangement depicted in FIG. 9. As mentioned above, the first radio node 110 and second radio node 120 are operable in a wireless communications network 100.

The first radio node 110 comprises an Input and output Interface 900 configured to communicate, with one or more radio nodes such as a second radio node 120. The input and output interface 900 may comprise a receiver (not shown) and a transmitter (not shown).

The first radio node 110 is configured to, e.g. by means of an obtaining module 902 configured to, obtain an indication of a first set of beams based on a beam prediction model, which first set of beams comprises a first beam and a number of first neighbouring beams to the first beam.

The first radio node 110 is configured to, e.g. by means of a sending module 904 configured to, send a training symbol on each respective beam in the first set of beams.

The first radio node 110 is configured to, e.g. by means of a receiving module 906 configured to, receive from the second radio node 120, feedback relating to one or more of the sent training symbols on each respective beam in the first set of beams.

In some embodiments, the received feedback from the second radio node 120 corresponding to the sent training symbols is adapted to be in the form of signal-to-noise ratio, SNR, or another measure related to the available channel information.

The first radio node 110 is configured to, e.g. by means of an Identifying module 908 configured to, identify a second beam based on the received feedback to be used for transmission.

In some embodiments, the first radio node 110 is further configured to, e.g. by means of the identifying module 908 configured to, identify a third set of beams comprising a third beam and a number of neighbouring beams based on the received feedback on each respective beam in the first set of beams.

In some embodiments, the first radio node 110 is further configured to, e.g. by means of the sending module 904 configured to, transmit instructions to the second radio node 120 to use the third set of beams for transmitting and receiving data.

The first radio node 110 is configured to, e.g. by means of an adapting module 910 configured to, adapt the beam prediction model based on the received feedback and the second beam.

The first radio node 110 is configured to, e.g. by means of a deciding module 912 configured to, decide whether to adjust the number of beams in the first set of beams based on a relationship between the first beam and the second beam, which adjusted first set of beams is to be used for sending training symbols before an upcoming communication between the first radio node 110 and the second radio node 120.

In some embodiments, the first radio node 110 is further configured to, e.g. by means of the deciding module 912 further configured to, decide whether to adjust the number of beams in the first set of beams, by further taking into account any one or more of: radio channel properties between the first radio node 110 and the second radio node 120 and packet error rates of the data being sent between the first radio node 110 and the second radio node 120.

In some embodiments, the first radio node 110 is further configured to, e.g. by means of the deciding module 912 further configured to, decide whether to adjust the number of beams in the first set of beams, by deciding to decrease the number of beams based on any one or more of:

the first and second beam overlap to a predefined level, the radio channel properties between the first radio node 110 and the second radio node 120 are above a first threshold, and the packet error rates of the data being sent between the first radio node 110 and the second radio node 120 are lower than a second threshold;

otherwise deciding to increase the number of beams in the first set of beams.

In some embodiments, the relationship between the first beam and the second beam is adapted to be associated to the extent that both beams coincide.

In some embodiments, the first radio node 110 is further configured to, e.g. by means of the obtaining module 902 further configured to, obtain the indication of the first set of beams, by performing one or more times the following:

The first radio node 110 may further be configured to, e.g. by means of the sending module 904 further configured to, send a training symbol on each of a set of available beams.

The first radio node 110 is further configured to, e.g. by means of the receiving module 906 further configured to, receive from the second radio node 120, feedback relating to one or more of the sent training symbols on each of the set of available beams.

In some embodiments, the received feedback from the second radio node 120 corresponding to the sent training symbols is adapted to be in the form of signal-to-noise ratio, SNR, or another measure related to the available channel information.

The first radio node 110 is further configured to, e.g. by means of the Identifying module 908 further configured to, identify a subset of beams of the set of available beams based on the received feedback.

The first radio node 110 is further configured to, e.g. by means of a creating or updating module 914 further configured to, create or update the beam prediction model based on the subset of beams of the set of available beams.

The first radio node 110 is further configured to, e.g. by means of the Identifying module 908 further configured to, identify the first beam based on the beam prediction model, which first beam is comprised in the first set of beams.

In some embodiments, the first radio node 110 is a wireless device and the second radio node 120 is any one of: a radio network node and a wireless device.

In some embodiments, the first radio node 110 is a network node and the second radio node 120 is any one of: a radio network node and a wireless device.

The embodiments herein for handling an access to a wireless communications network 100, may be implemented through one or more processors, such as a processor 916 of a processing circuitry in the first radio node 110 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the first radio node 110. One such carrier may be in the form of a CD ROM disc. It is however feasible with other data carriers such as a memory stick. The computer program code may furthermore be provided as pure program code on a server and downloaded to the first radio node 110.

The first radio node 110 may further comprise a memory 918 comprising one or more memory units. The memory 918 comprises instructions executable by the processor 916.

The memory 918 is arranged to be used to store configuration information, feedback, data, and applications to perform the methods herein when being executed in the first radio node 110.

In some embodiments, a computer program 920 comprises instructions, which when executed by the at least one processor 916, cause the at least one processor 916 to perform actions according to any of the Actions 201-212.

In some embodiments, a carrier 922 comprises the computer program 920, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first radio node 110, described above may refer to a combination of analog and digital circuits, and/or one or more processors configured with software and/or firmware, e.g. stored in the memory 918, that when executed by the one or more processors such as the processor 916 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method performed by a first radio node for adjusting a set of beams for communication with a second radio node, which first radio node and second radio node operate in a wireless communications network, the method comprising:

obtaining an indication of a first set of beams based on a beam prediction model, which first set of beams comprises a first beam and a number of first neighbouring beams to the first beam;

sending a training symbol on each respective beam in the first set of beams;

receiving from the second radio node, feedback relating to at least one of the sent training symbols on each respective beam in the first set of beams;

identifying a second beam based on the received feedback to be used for transmission;

adapting the beam prediction model based on the received feedback and the second beam; and deciding whether to adjust the number of beams in the first set of beams based on a relationship between the first beam and the second beam, which adjusted first set of beams is to be used for sending training symbols before an upcoming communication between the first radio node and the second radio node.

2. The method according to claim 1, wherein obtaining the indication of the first set of beams, comprises performing at least one time:

sending a training symbol on each of a set of available beams;

receiving from the second radio node, feedback relating to at least one of the sent training symbols on each of the set of available beams;

identifying a subset of beams of the set of available beams based on the received feedback;

one of creating and updating the beam prediction model based on the subset of beams of the set of available beams; and identifying the first beam based on the beam prediction model, which first beam is comprised in the first set of beams.

3. The method according to claim 2, wherein identifying the second beam further comprises identifying a third set of beams comprising a third beam and a number of neighbouring beams based on the received feedback on each respective beam in the first set of beams, and transmitting instructions to the second radio node to use the third set of beams for transmitting and receiving data.

4. The method according to claim 2, wherein deciding whether to adjust the number of beams in the first set of beams is further based on at least one of: radio channel properties between the first radio node and the second radio node, and packet error rates of the data being sent between the first radio node and the second radio node.

5. The method according to claim 1, wherein identifying the second beam further comprises identifying a third set of beams comprising a third beam and a number of neighbouring beams based on the received feedback on each respective beam in the first set of beams, and transmitting instructions to the second radio node to use the third set of beams for transmitting and receiving data.

6. The method according to claim 1, wherein deciding whether to adjust the number of beams in the first set of beams is further based on at least one of: radio channel properties between the first radio node and the second radio node, and packet error rates of the data being sent between the first radio node and the second radio node.

7. The method according to claim 1, wherein the relationship between the first beam and the second beam is associated to the extent that both beams coincide.

8. The method according to claim 1, wherein deciding whether to adjust the number of beams in the first set of beams further comprises deciding to decrease the number of beams based on at least one of the first and second beams overlapping to a predefined level, the radio channel properties between the first radio node and the second radio node being above a first threshold, and the packet error rates of the data being sent between the first radio node and the second radio node being lower than a second threshold;

otherwise deciding to increase the number of beams in the first set of beams.

9. The method according to claim 1, wherein the received feedback from the second radio node corresponding to the sent training symbols is in the form of one of signal-to-noise ratio, SNR, and another measure related to the available channel information.

10. A computer storage medium storing a computer program comprising instructions, which when executed by a processor, causes the processor to perform a method for a first radio node for adjusting a set of beams for communication with a second radio node, which first radio node and second radio node operate in a wireless communications network, the instructions causing the processor to:

obtain an indication of a first set of beams based on a beam prediction model, which first set of beams comprises a first beam and a number of first neighbouring beams to the first beam;

send a training symbol on each respective beam in the first set of beams;

receive from the second radio node, feedback relating to at least one of the sent training symbols on each respective beam in the first set of beams;

identify a second beam based on the received feedback to be used for transmission;

adapt the beam prediction model based on the received feedback and the second beam; and decide whether to adjust the number of beams in the first set of beams based on a relationship between the first beam and the second beam, which adjusted first set of beams is to be used for sending training symbols before an upcoming communication between the first radio node and the second radio node.

11. A first radio node for adjusting a set of beams for communication with a second radio node, which first radio node and second radio node are operable in a wireless communications network, the first radio node is configured to:

obtain an indication of a first set of beams based on a beam prediction model, which first set of beams comprises a first beam and a number of first neighbouring beams to the first beam;

send a training symbol on each respective beam in the first set of beams;

receive from the second radio node, feedback relating to at least one of the sent training symbols on each respective beam in the first set of beams;

identify a second beam based on the received feedback to be used for transmission;

adapt the beam prediction model based on the received feedback and the second beam; and decide whether to adjust the number of beams in the first set of beams based on a relationship between the first beam and the second beam, which adjusted first set of beams is to be used for sending training symbols before an upcoming communication between the first radio node and the second radio node.

12. The first radio node according to claim 11, further configured to obtain the indication of the first set of beams, by performing at least one time:

sending a training symbol on each of a set of available beams;

receiving from the second radio node, feedback relating to one or more of the sent training symbols on each of the set of available beams;

identifying a subset of beams of the set of available beams based on the received feedback;

one of creating and updating the beam prediction model based on the subset of beams of the set of available beams; and identifying the first beam based on the beam prediction model, which first beam is comprised in the first set of beams.

13. The first radio node according to claim 11, further configured to identify a second beam by identifying a third set of beams comprising a third beam and a number of neighbouring beams based on the received feedback on each respective beam in the first set of beams, and transmit instructions to the second radio node to use the third set of beams for transmitting and receiving data.

14. The first radio node according to claim 11, further configured to decide whether to adjust the number of beams in the first set of beams by further taking into account at least one of: radio channel properties between the first radio node and the second radio node, and packet error rates of the data being sent between the first radio node and the second radio node.

15. The first radio node according to claim 11, wherein the relationship between the first beam and the second beam is adapted to be associated to the extent that both beams coincide.

16. The first radio node according to claim 11, further configured to decide whether to adjust the number of beams in the first set of beams further comprises deciding to decrease the number of beams based on at least one of the first and second beams overlapping to a predefined level, the radio channel properties between the first radio node and the second radio node being above a first threshold, and the packet error rates of the data being sent between the first radio node and the second radio node being lower than a second threshold;

otherwise deciding to increase the number of beams in the first set of beams.

17. The first radio node according to claim 11, wherein the received feedback from the second radio node corresponding to the sent training symbols is adapted to be in the form of one of signal-to-noise ratio, SNR, and another measure related to the available channel information.

18. The first radio node according to claim 11, wherein the first radio node is a wireless device and the second radio node is any one of: a radio network node and a wireless device.

19. The first radio node according to claim 11, wherein the first radio node is a network node and the second radio node is any one of: a radio network node and a wireless device.

* * * * *